United States Patent [19]

Yamada

[11] 4,402,007
[45] Aug. 30, 1983

[54] DIGITAL MASKING OPERATION METHOD AND MACHINE

[75] Inventor: Mitsuhiko Yamada, Kyoto, Japan

[73] Assignee: Dainippon Screen Seizo Kabushiki Kaisha, Kyoto, Japan

[21] Appl. No.: 378,188

[22] Filed: May 14, 1982

Related U.S. Application Data

[63] Continuation of Ser. No. 142,649, Apr. 22, 1980.

[30] Foreign Application Priority Data

Apr. 23, 1979 [JP] Japan .................................. 54-49080

[51] Int. Cl.³ .............................................. H04N 1/46
[52] U.S. Cl. ...................................... 358/75; 358/78; 358/80
[58] Field of Search ................................... 358/75-80

[56] References Cited

U.S. PATENT DOCUMENTS 3,885,244  5/1975  Keller ...................................... 358/80
4,054,916 10/1977  Knop ....................................... 358/75
4,060,829 11/1977  Sakamoto ............................... 358/80
4,096,519  6/1978  Hoffrichter ............................ 358/75
4,270,141  5/1981  Sakamoto ............................... 358/78
4,275,413  6/1981  Sakamoto ............................... 358/80

Primary Examiner—Michael A. Masinick
Attorney, Agent, or Firm—Zarley, McKee, Thomte, Voorhees & Sease

[57] ABSTRACT

A digital masking operation method and machine used in a color control system of a picture reproducing machine such as a color scanner, a color facsimile, or the like, wherein n sets of memory tables are indexed by means of color separation data of primary colors, and wherein data from each memory table is utilized to output a partial sum of predetermined relation to the input according to a conversion table stored therein and then the output data of the primary colors are added for each of the primary colors, in an adder thereby obtaining masking data for each of the primary colors.

19 Claims, 5 Drawing Figures

DIGITAL MASKING OPERATION METHOD AND MACHINE

This is a continuation of application Ser. No. 142,649, filed Apr. 22, 1980.

BACKGROUND OF THE INVENTION

This invention relates to a method and machine for carrying out a masking operation in a digital manner, in a color control system of a picture reproducing machine such as a color scanner, a color facsimile, or the like.

In a conventional picture reproducing machine (e.g., a color scanner, a color facsimile or the like), a color control process such as masking, color correction, and so forth, has been carried out by electronically processing picture signals obtained by scanning an original picture through analog circuitry. This method has good stability, reliability, reproducibility, and so forth, compared with a photographic method.

However, in recent years, with the requirements on stability, reliability and, the reproducibility, becoming increasingly more demanding, a conventional analog operational circuit has become inadequate because integrated operational amplifiers, resistors, potentiometers, and many other components of the analog operational circuit depend on temperature and their rate of use. Thus, after a long period of use, the stability, reliability, and reproducibility of these elements deteriorates to the point where the components function is affected.

In order to overcome these problems, when an operational circuit is to be composed, the highest quality components are used and temperature compensation circuits are added. However, this results in a complicated operational circuit, and accordingly, in general, less reliability and increased cost.

Thus, in order to improve stability, reliability, and reproducibility of the color control process circuitry, a digitalized operational digital method has been proposed. In this method, the processing of signals is performed on a real time basis at high speed, and color correction is carried out by transforming, not calculating, the color space coordinates of input color separation signals R, G and B of additive primary colors (such as red, green and blue) into those of output color separation signals Y, M and C of subtractive primary colors (such as yellow, megenta and cyan).

If each of the red, green and blue range is divided, for example, into $2^8$ tone steps, or if each color is coded by eight bits, a capacity corresponding to $2^{24}$ steps for each combination of three colors is required, and consequently such a coordinate transformation method requires a memory having a large capacity. This means high cost, and thus is not practicable.

In this prior this method, the coordinate transformation is performed by a three-dimensional memory table wherein the combinations of three color recording digital signals Y, M and C are stored and are read out of the table when addressed by various combinations of three color picture digital signals R, G and B corresponding thereto. This method offers the advantage of high speed, but, in practice, a prohibitively large memory capacity is required.

Therefore, in order to reduce the required capacity of the memory, a linear interpolation method has been proposed. One proposed interpolation method divides each of the red, green and blue range into three-dimensional tone steps. The intermediate value between adjacent steps interpolated from the adjacent steps. The adjacent values cooreaspond to each of the possible combinations of the recording signals Y, M and C. Signals of combinations Y, M and C which are read out of the memory by the combinations of the picture signals R, G and B corresponding thereto.

However, the relation between the picture and the recording signal is better represented by a quadratic equation. Accordingly, the errors in the values derived by linear interpolation and are often beyond an acceptable limit range. In order to perform a faithful interpolation operation, a time consuming, a complex interpolation method. Thus, it is virtually impossible to carry out this complex interpolation method in a real time process.

The essential conditions for color correction, when the picture reproducing machine such as a color scanner is operated, can be itemized in the following.
1. Color correction conditions can be readily set up;
2. Color correction conditions are minimized in number;
3. Each color correction condition can be independently set up;
4. Color correction conditions can be expressed in a simple manner for easy comparison with their standard values;
5. Color correction conditions can be specified without ambiguity;
6. Color correction conditions remain stable for a long period of time;
7. The same results are obtained from the color correction conditions over a long period of time;
8. Color correction conditions can be readily recorded in a recording medium such as a tape or a card; and
9. The color correction conditions data which has been obtained experientially by operating the color scanner can be utilized for subsequent operations.

Because of the above indicated problems with analog circuitry, it is desirable to satisfy these items by a digital circuitry, it is desirable to satisfy these items by a digital method, but no workable conventional digital method was known.

For instance, in a conventional digital method utilizing the three-dimensional memory table, each color correction condition cannot be determined independently since it is closely related to other color correction conditions. Therefore, if a part of the conditions is replaced, all of the table must be changed. This means a large number of tables are required for covering all the possibilities of color correction conditions. As a result, a certain interpolation technique becomes necessary for proper color correction along with complicated conditions for carrying it out.

This conventional digital processing is essentially a coordinate transformation from a combination of three color picture signals R, G and B to a corresponding combination of three color recording signals Y, M and C by a table in a color space, as described above, and color correction conditions such as hue, saturation, brightness, color balance, and so forth, are related closely to one another. Therefore, it is difficult to indicate the magnitude of correction for these color correction conditions in the same manner as a conventional analog method.

From above description, it is understood that the conventional digital color scanners cannot satisfy all the above items, in particular, items 1, 3, 4, 5 and 9.

As regards the item 9, in particular, it is not an essential function of a color scanner, but is an important condition if the scanner is to be an efficient device.

Further, in the conventional three-dimensional coordinate transformation process, if each picture signal R, G and B is coded by a binary code having 8 bits, each combination of three picture signals R, G and B corresponds to a binary code having 24 bits, which means that the system storage capacity must be at least $2^{24}$.

The color corresponding to each combination of three picture signals R, G and B can be represented by brightness, saturation and hue, as is well-known. Brightness requires the maximum resolving power. In conventional digital methods brightness, saturation and hue are expressed by binary codes, each having 8 bits. However, brightness and saturation share a common component, i.e., and equivalent gray density component, and hence saturation possesses a redundancy. Furthermore, it is well known that the resolving power for hue may be reduced as compared with that for brightness, without impairing the color of reproduced pictures.

Accordingly, in processing, color data the sampling steps for saturation and hue may be compressed, and thus these two factors may be represented by binary codes having 6 bits (i.e. altogether $2^{20}$ is all that is necessary for each combination of three color picture signals R, G and B).

SUMMARY OF THE INVENTION

It is an object of the present invention to provide a digital masking operation method used in a color control system of a picture reproducing machine free from the aforementioned defects, which is stable, simple, reliable and reproducible, and which is capable of processing each of the color separation signals of primary colors, independently.

It is another object of the present invention to provide a digital masking operation machine used in a color control system of a picture reproducing machine free from the aforementioned defects, which is stable, simple, reliable, and reproducible, and which is capable of processing each of the color separation signals of primary colors, independently, by using memory tables.

Accordingly, the present invention discloses a digital masking operation method for converting a color signal into a masking color signal for each of primary colors in a color control system of a picture reproducing machine, comprising, for each of the primary colors, the steps of: (a) providing a memory table, for each of the primary colors, which has a one-to-one correspondence between its input and output; (b) processing the color signals with the memory tables, and (c) obtaining the masking color signal as a sum of the outputs from the memory tables.

There is also disclosed a digital masking operation machine for converting a color signal into a masking color signal for each of primary colors in a color control system of a picture reproducing machine, comprising, for each of the primary colors: the same number of digital memory tables as the number of primary colors, each having a one-to-one correspondence between its input and output, and at least one adder for adding up the outputs from the memory tables.

BRIEF DESCRIPTION OF DRAWINGS

In order that the present invention may be better understood, preferred embodiments thereof will be described with reference to the accompanying drawings, in which.

DESCRIPTION OF PREFERRED EMBODIMENTS

Figure 1:
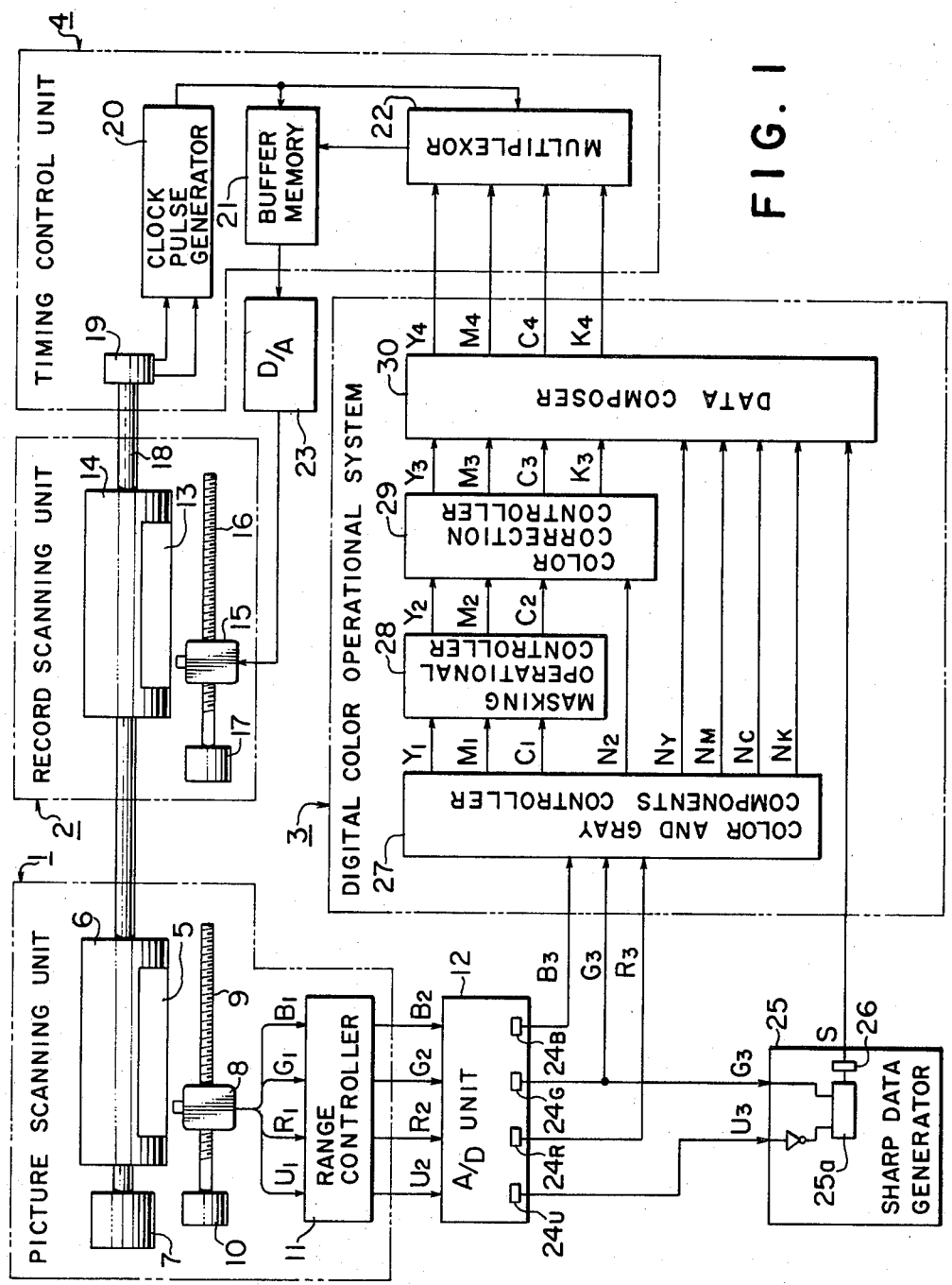
FIG. 1 is a schematic view of a color scanner including a digital masking operation machine according to the present invention.
Figure 2:
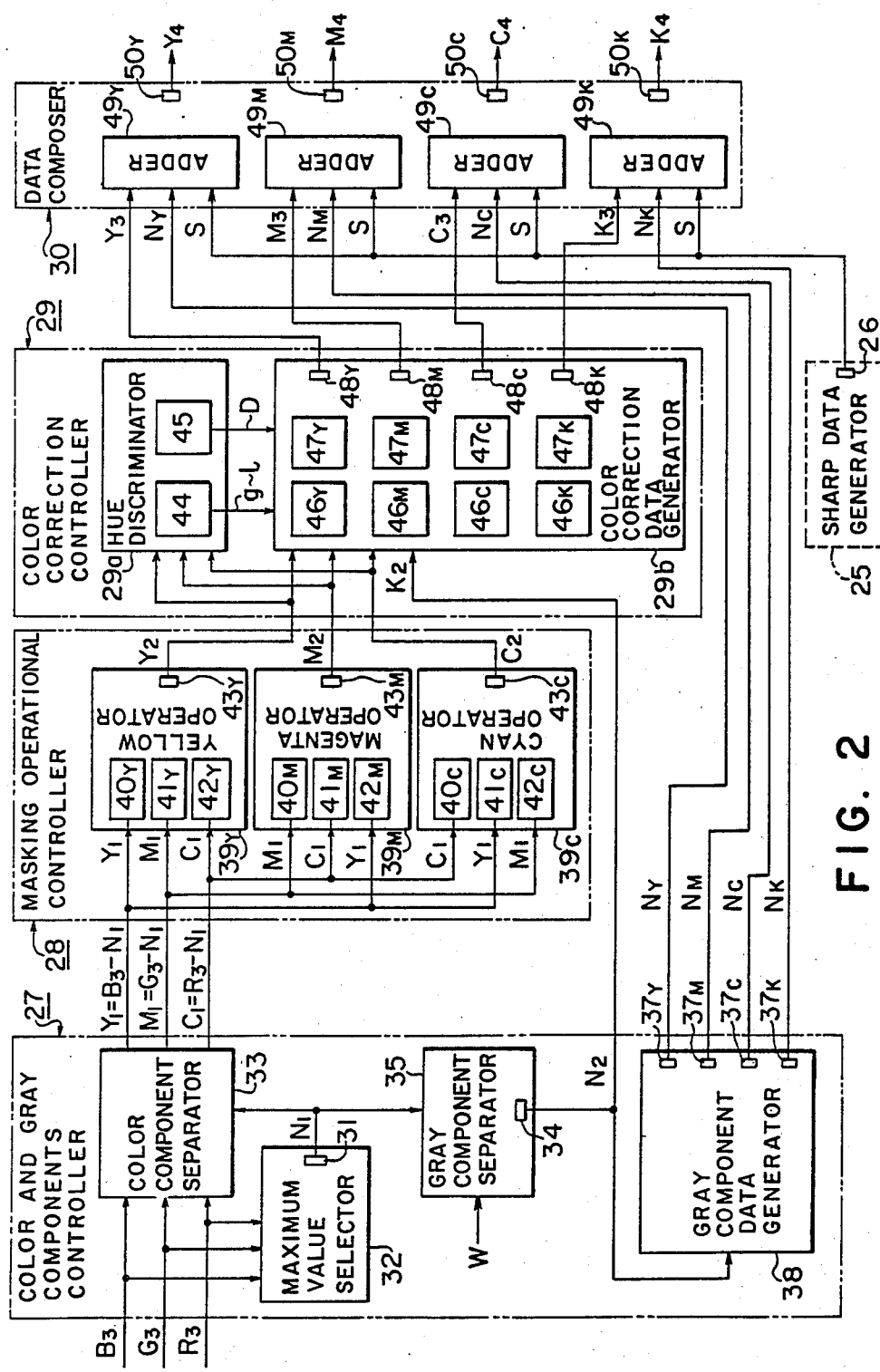
FIG. 2 is a block diagram of the digital color operational system in FIG. 1.

Referring now to the drawings, there is shown in FIG. 1 a color scanner for carrying out a digital color control operation, including a masking operation machine according to the present invention, which comprises a picture scanning unit 1, a record scanning unit 2, a digital color operational system 3 and a timing control unit 4.

The picture scanning unit 1 is of a conventional type. Unit 1 comprises a picture cylinder 6 on which an original color picture 5 is secured, a drive motor 7 for rotating the picture cylinder 6 through a rotary shaft 18, a pickup head 8 having a color separator for scanning the original picture 5 to obtain an analog picture signal which is then separated therein into three color separation signals $R_1$, $G_1$ and $B_1$ and an unsharp signal $U_1$ in a conventional manner, a screw shaft 9 extending parallel with the axis of the picture cylinder 6 on which the pickup head 8 is movably mounted, a drive motor 10 for rotating the screw shaft 9, and a range controller 11 which logarithmically converts the signals $R_1$, $G_1$, $B_1$ and $U_1$ into picture density signals $R_2$, $G_2$, $B_2$ and $U_2$ and sets up shadow and highlight points so as to determine a certain range for the picture density signals.

The picture density signals $R_2$, $G_2$, $B_2$ and $U_2$ are sent to an analog-digital converter unit 12, hereinafter referred to as a A/D converter, having latch circuits 24R, 24G, 24B and 24U. The minimum and the maximum input levels are adjusted by the range controller 11, as described above.

The record scanning unit 2 is of a conventional type. Unit 2 comprises a recording cylinder 14 which is coaxially arranged with the picture cylinder 6 via a rotary shaft 18, and on which a recording film 13 is mounted, a recording head 15 having a light source control means for recording a reproduction picture on the recording film 13, a screw shaft 16 extending parallel with the axis of the recording cylinder 14, on which the recording head 15 is movably mounted, and a drive motor 17 for driving the screw shaft 16.

The digital color operational system 3 which is the essence of the present invention, comprises a color and gray components controller 27, a masking operational controller 28, a color correction controller 29, and a data composer 30, which are hereinafter described in detail.

The timing control unit 4 is of a conventional type. Unit 4 comprises a rotary encoder 19 which is coaxially arranged with the two cylinders 6 and 14 via the rotary shaft 18, and includes a timing pulse generator which generates a plurality of timing pulses per revolution of the cylinders 6 and 14, and one-rotation pulse generator which generates one-rotation pulse per revolution of the cylinders 6 and 14, a clock pulse generator 20 which receives the timing pulses and the one-rotation pulse from the rotary encoder 19 and outputs clock pulses having desired periods and pulse widths, a buffer memory 21 which receives the clock pulses from the clock pulse generator 20 and outputs a picture recording signal to the recording head 15 via a digital-analog converter 23, hereinafter referred to as a D/A converter, at a proper timing depending on a desired magnification factor, and a multiplexor 22 which selects a picture recording data for one of the ink colors, which is fed from the data composer 30, and sends it to the buffer memory 21.

The timing control of the motors 7, 10 and 17 for the cylinders 6 and 14, the pickup head 8 and the recording head 15 are carried out in a conventional manner, and thus the detailed explanation thereof is omitted for the simplicity of description.

The recording cylinder 14 may be driven independently by another drive motor, if necessary, and, in this case, the timing control unit 4 should be connected to the recording unit 2.

In this case, the recording unit 2 records the reproduction picture on the recording film 13, but the reproduction picture may be alternatively displayed in a cathode ray tube, or the like.

In the A/D converter 12, the picture density signals $R_2$, $G_2$, $B_2$ and $U_2$ of the color chambers R, G, B and U are converted into digital picture signals, i.e. binary coded data $R_3$, $G_3$, $B_3$ and $U_3$, and are latched in the latch circuits 24R, 24G, 24B and 24U in the output stage. In this embodiment, each data $R_3$, $G_3$, $B_3$ or $U_3$ having 8 bits is transferred through the bus line of each channel and is processed in a real time.

The A/D converter 12 and the 8-bits latch circuits 24R, 24G, 24B and 24U therein are controlled in synchronization with the clock pulses generated by the clock pulse generator 20. The period of the clock pulses is selected to provide the desired resolving power for the scanner, and is used as a principal clock pulse in the operational system 3 wherein data is processed based upon the sampling period of the clock pulse in a real time process.

One of the three data $R_3$, $G_3$, and $B_3$, for instance, the data $G_3$, and the data $U_3$ are sent to a sharp data generator 25 having an subtractor 25a and a 8-bit latch circuit 26 which is capable of synchronizing the data operation speed with that in the operational system 3. The sharp data generator 25 processes a detail emphasis data S for imparting specific sharpness effect to the reproduction picture by deducting the data $U_3$ including an unsharp component from the data $G_3$ including a sharp component in the subtractor 25a in a manner similar to the analog method, and the detail emphasis data S is latched in the latch circuit 26. The detail emphasis data S is added to the ink color data which is color-corrected in the data composer 30 at the end of the color operation process, as will be described later.

The data $R_3$, $G_3$ and $B_3$ are fed, from the latch circuit 24R, 24G and 24B, to the digital color operational system 3 in which the data $R_3$, $G_3$ and $B_3$ are consecutively controlled in the color and gray components controller 27, the masking operational controller 28, the color correction controller 29, and then the data composer 30, as hereinafter described.

The color and gray components controller 27 separates the three color data $R_3$, $G_3$ and $B_3$ into color and gray component data, and comprises: (a) a maximum value selector 32 having an 8 bits latch circuit 31, which selects one data having the maximum value from the color data $R_3$, $G_3$ and $B_3$, i.e. $N_1=(R_3,G_3,B_3)max$, and latches the data $N_1$ in the latch circuit 31; (b) a color component separator 33 which separates and outputs ink color recording data $Y_1$, $M_1$ and $C_1$, corresponding to the ink color, consisting of hue and saturation data of the combination of the three color data $R_3$, $G_3$ and $B_3$ based upon the data $N_1$ sent from the maximum value selector 32; (c) a gray component separator 35 having an 8-bit latch circuit 34, which separates an equivalent gray density data $N_2=W-N_1$, (wherein W means a predetermined reference white level data, representing an equivalent gray density component of the ink color corresponding to an equivalent gray density component of the combination of the data $R_3$, $G_3$ and $B_3$) by subtracting the maximum value data $N_1$ sent from the maximum value selector 32 from the reference white level data W, and the equivalent gray density data $N_2$ is latched in the latch circuit 34; and (d) a gray component data generator 38 including memory tables 36Y, 36M, 36C and 36K and 8-bit latch circuits 37Y, 37M, 37 C and 37K, for yellow, magenta, cyan and black ink colors, in which the memory tables 36Y, 36M, 36C and 36K are indexed by the equivalent gray density data $N_2$ to output gray component separation data Ny, Nm, Nc and Nk for yellow, magenta, cyan and black ink colors which are latched in the latch circuits 37Y, 37M, 37C and 37K, and then are sent to the data composer in order to be added to color-corrected data.

The masking operational controller 28 carries out the masking operation by using a masking equation, and comprises three color operators 39Y, 39M, and 39C for yellow, magenta and cyan. Each operator 39Y, 39M or 39C includes three memory tables 40Y, 41Y and 42Y; 40M, 41M and 42M; or 40C, 41C and 42C; and an 8-bit latch circuit 43Y, 43M or 43C. The memory tables 40Y, 41Y and 42Y are addressed by the ink color data $Y_1$, $M_1$ and $C_1$ fed from the color component separator 33 so as to output data which are summed to obtain a yellow data $Y_2$, which is then latched in the latch circuit 43Y. Each combination of memory tables 40M, 41M and 42M; or 40C, 41C and 42C are indexed simultaneously by the ink color data $Y_1$, $M_1$ and $C_1$ in the same manner as described above, and a magenta or cyan data $M_2$ or $C_2$ is latched in the latch circuit 43M or 43C.

The color correction controller 29 performs color correction operations on the three ink color data $Y_2$, $M_2$ and $C_2$ sent from the masking operational controller 28. Controller 29 comprises a hue discriminator 29a and a color correction data generator 29b. The hue discriminator 29a comprises a first color discriminator circuit 44 which divides the hue range of the data $Y_2$, $M_2$ or $C_2$ into a certain number of divisions (e.g., six divisions), and a second color discriminator circuit 45 which further divides the hue range into small divisions (e.g., 16 sub-divisions).

The color correction data generator 29b comprises four memory tables 46Y, 46M, 46C and 46K which are indexed by the output signals of the discriminator circuits 44 and 45 to output color correction data $\Delta Y$, $\Delta M$, $\Delta C$ and $\Delta K$, four add-subtractors 47Y, 47M, 47C and 47K which add or subtract the correction data to or from the data $Y_2$, $M_2$, $C_2$ and $K_2=N_1$ fed from the color operators 39Y, 39M and 39C and the gray component separator 35, in order to obtain the corrected data $Y_3$, $M_3$, $C_3$ and $K_3$, respectively, and four 8-bit latch circuits 48Y, 48M, 48C and 48K which latch the corrected data $Y_3$, $M_3$, $C_3$ and $K_3$ therein.

The data composer 30 comprises four adders 49Y, 49M, 49C and 49K, and four 8-bit latch circuits 50Y, 50M, 50C and 50K, for yellow, magenta, cyan and black ink colors. The adders 49Y, 49M, 49C and 49K add the gray component separation data Ny, Nm, Nc and Nk sent from the gray component data generator 38 and the detail emphasis data S sent from the sharp data generator 25 to the color-corrected data $Y_3$, $M_3$, $C_3$ and $K_3$ fed from the color correction controller 29, thereby obtaining color-controlled, color separation recording data $Y_4$, $M_4$, $C_4$ and $K_4$ of yellow, magenta, cyan and black ink colors, which are latched in the latch circuits 50Y, 50M, 50C and 50K.

The picture recording data $Y_4$, $M_4$, $C_4$ and $K_4$ are sent to the multiplexor 22, and then are selectively fed to the buffer memory 21. Then, the buffer memory 21 sends the picture recording signal to the recording head 15 through the D/A converter 23, and the recording head 15 records the color separation reproduction pictures on the recording film 13 on the recorder cylinder 14, as shown in FIG. 1.

Now, the masking operation will be described in detail in connection with FIGS. 3–5.

In the conventional method, the following masking formulae have been used for the masking operation, wherein Yi, Mi and Ci are three color data before masking operation, wherein $Y_0$, $M_0$ and $C_0$ are three color data after masking operation, and wherein $a_{y1}$, $a_{y2}$, ..., and $a_{c3}$ are masking factors.

$$Y_0 = a_{y1}Yi - a_{y2}Mi - a_{y3}Ci \quad (1)$$

$$M_0 = a_{m1}Mi - a_{m2}Ci - a_{m3}Yi$$

$$C_0 = a_{c1}Ci - a_{c2}Yi - a_{c3}Mi$$

These formulae are linear equations, and the masking factors $a_{y1}$, $a_{y2}$, ... $a_{c3}$ cannot be varied as a function on the data Yi, Mi and Ci. However, in order to accurately reproduce light and dark color points in a picture, the masking factors $a_{y1}$, ..., and $a_{c3}$ need to be varied. Therefore, in such a case, the formulae (1) should not be used, and reproduction should be carried out by utilizing a quadratic masking formulae.

The masking operational controller 28 is adapted to compute such a quadratic masking formulae. As the computations for yellow, magenta and cyan are carried out in the same manner, only the computation for yellow will be described for FIGS. 3–5.

A high order masking formula is already known and it is a set of quadratic equations known as Clapper's equations.

Clapper's equations are:
$$Y_2 = a_{y1}Y_1 + a_{y2}M_1 + a_{y3}C_1 + a_{y4}Y_1^2 + a_{y5}M_1^2 + a_{y6}C_1^2 + \quad (2)$$

$$a_{y7}Y_1M_1 + a_{y8}M_1C_1 + a_{y9}C_1Y_1$$

$$M_2 = a_{m1}M_1 + a_{m2}C_1 + a_{m3}Y_1 + a_{m4}M_1^2 + a_{m5}C_1^2 + a_{m6}Y_1^2 +$$

$$a_{m7}M_1C_1 + a_{m8}C_1Y_1 + a_{m9}Y_1M_1$$

$$C_2 = a_{c1}C_1 + a_{c2}Y_1 + a_{c3}M_1 + a_{c4}C_1^2 + a_{c5}Y_1^2 + a_{c6}M_1^2 +$$

$$a_{c7}C_1Y_1 + a_{c8}Y_1M_1 + a_{c9}M_1C_1$$

The formula for yellow color in the formulae (2) is written in the following.

$$Y_2 = (a_{y1} + a_{y4}Y_1)Y_1 + (a_{y2} + a_{y5}M_1)M_1 + (a_{y3} + a_{y6}C_1)C_1 + \quad (3)$$

$$a_{y7}Y_1M_1 + a_{y8}M_1C_1 + a_{y9}C_1Y_1$$

The color correction data ΔY, that is, the sum of the three quadratic items including two independent variables are expressed in the following.

$$\Delta Y = a_{y7}Y_1M_1 + a_{y8}M_1C_1 + a_{y9}C_1Y_1 \quad (4)$$

The ΔY term may be removed from the formula (3) since such terms can be corrected in the following step, i.e. the color correction controller 29, thereby obtaining the following formula.

$$Y'_2 = (a_{y1} + a_{y4}Y_1)Y_1 + (a_{y2} + a_{y5}M_1)M_1 + (a_{y3} + a_{y6}C_1)C_1 \quad (5)$$

When the value of the data $Y_1$, $M_1$ and $C_1$ are given, each term in the formula (5) is determined. Thus, the terms of formula (5) can be presented in a one-dimer memory table, viz. the tables are indexed by the data $Y_1$, $M_1$ and $C_1$ to output three 8-bit data corresponding to $(a_{y1}+a_{y4}Y_1)Y_1$, $(a_{y2}+a_{y5}M_1)M_1$, and $(a_{y3}+a_{y6}C_1)C_1$ in the formula (5), stored in the tables, and then the three sets of data are added up to obtain the data $Y_2'$. In the same manner as this method, the data $M_2'$ and $C_2'$ are obtained.

Figure 3:
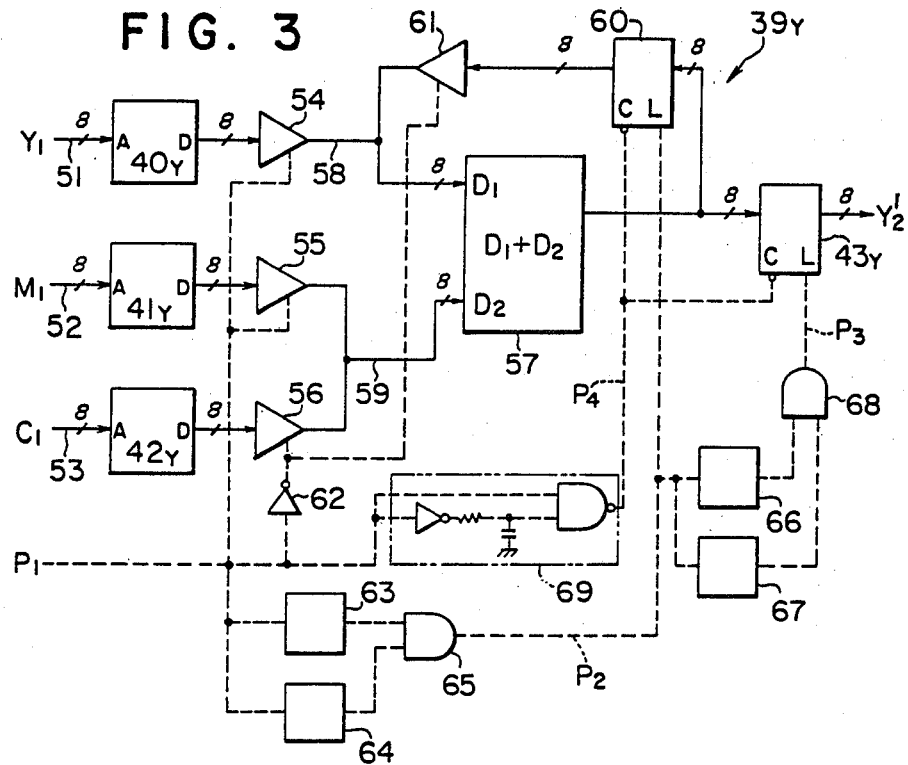
FIG. 3 is a block diagram of the yellow operator in the masking operation machine in FIG. 2.

In FIG. 3 is shown the first embodiment of the separator 39y for yellow ink color including three memory tables 40Y, 41Y and 42Y. To the memory tables 40Y, 41Y and 42Y are fed the three 8-bit data $Y_1$, $M_1$ and $C_1$ sent from the color component separator 33 via address busses 51, 52 and 53, respectively. In the memory tables 40Y, 41Y and 42Y, the three data are stored in advance in the form of tables and then the tables are addressed by the color data $Y_1$, $M_1$ and $C_1$ to output the corresponding three data, respectively, which are then sent to bus buffers 54, 55 and 56 whose output lines are connected to an adder 57 in such a manner that the buffer 54 is connected to the terminal $D_1$ while the buffers 55 and 56 are connected to the terminal $D_2$.

In the first adding mode, the data from the table 40Y and the data from the table 41Y are sent to terminals $D_1$ and $D_2$ of the adder 57 via the buffers 54 and 55, respectively, with the buffers 54 and 55 enabled by a clock pulse P1. The two data are added in the adder 57, and then the resulting data is sent to an 8-bit latch circuit 60 and is latched therein.

In the second adding mode, the data latched in the latch circuit 60 and the data from the table 42Y are fed to the terminals $D_1$ and $D_2$ of the adder 57 via a bus buffer 61 and the bus buffer 56 with the buffers 61 and 56 enabled by the clock pulse P1 which is supplied to them via an inverter 62. Then, the two data are added in the adder 57 to obtain the data $Y_2'$, which is sent then to the latch circuit 43Y and is latched therein.

The two adding modes are controlled by the clock pulse P1 as described above. In the first adding mode, the leading edge (H-level) of the pulse P1 having a sufficiently shorter pulse width than its period, controls the bus buffers 54 and 55 so as to allow the passage of the data therethrough and controls the bus buffers 56 and 61, via the inverter 62, so as to forbid the passage of the data therethrough. In the second adding mode, the trailing edge (L-level) of the pulse P1 controls the bus buffers 54 and 55 so as to forbid the passage of the data therethrough and controls the bus buffers 56 and 61 so as to allow the passage of the data therethrough.

The pulse P2, the timing of its leading edge crossing over that of the trailing edge of the pulse P1, is made from the pulse P1 by a pulse delay circuit comprising a combination of mono-stable multi-vibrators 63 and 64 and an AND gate 65. The leading edge of the pulse P2 latches the sum data output from the adder 57, obtained in the first adding mode, in the latch circuit 60 before starting the second adding mode.

Then the clock pulse P2 is sent to a pulse delay circuit comprising a combination of mono-stable multi-vibrators 66 and 67 and an AND gate 68 to obtain a clock pulse P3, the timing of its leading edge crossing somewhat over that of the trailing edge of the pulse P2. The leading edge of the pulse P3 latches the $Y_2'$ output from the adder 57, which was obtained in the second adding mode, in the latch circuit 43Y.

The clock pulse P1 is sent to a logic differential circuit 69 wherein a reset pulse P4 is made by differentiating the leading edge of the clock pulse P1, and the reset pulse P3 clears the latch circuits 43Y and 60 just after the first adding mode is started.

Figure 4:
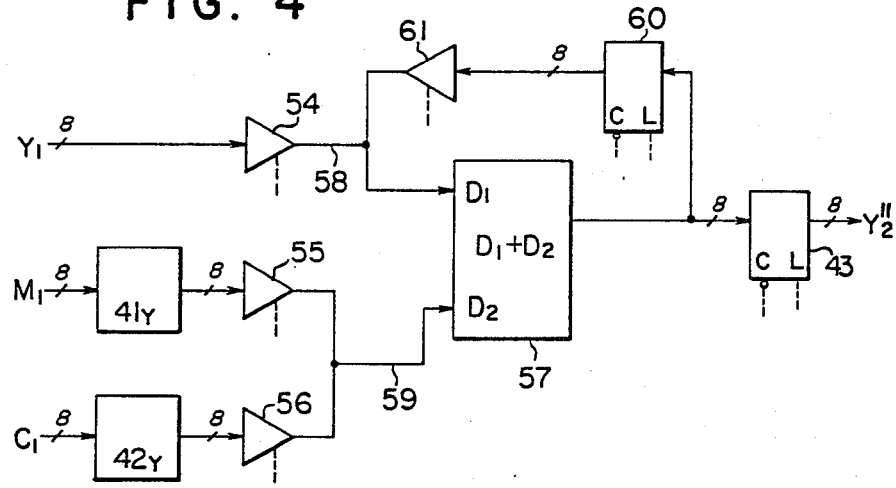
FIG. 4 is another embodiment of the yellow operator.

FIG. 4 shows the second embodiment of the yellow operator which is almost the same as the one in FIG. 3, except that the memory table 40Y to which the yellow data $Y_1$ is fed, is omitted to simplify the masking operation. The operation is performed according to the following formula (6) which is obtained by modifying the formula (5).

$$Y_2'' = Y_1 + (a_{y2} + a_{y5}M_1)M_1 + (a_{y3} + a_{y6}C_1)C_1 \qquad (6)$$

In this embodiment, the terms for the data $Y_1$ are simplified by virtue of the fact that the color correction controller 29 in the following stage can carry out the color correction operation expressed by a higher-order (non-linear) equation, like the masking operational controller 28, and thus the color correction data on one of the data $Y_1$ may be computed in the color correction controller 29.

In this case, as shown in FIG. 4, the data $Y_1$ is directly supplied to the bus buffer 54. The other components and their functions in FIG. 4 are the same as those in FIG. 3 and thus detailed explanations thereof are omitted.

In the other color separators, the memory tables 40M and 40C in which the magenta and the cyan data $M_1$ and $C_1$ are fed, may be omitted in the same manner as described above, and accordingly three memory tables 40Y, 40M and 40C are omitted in this embodiment.

Figure 5:
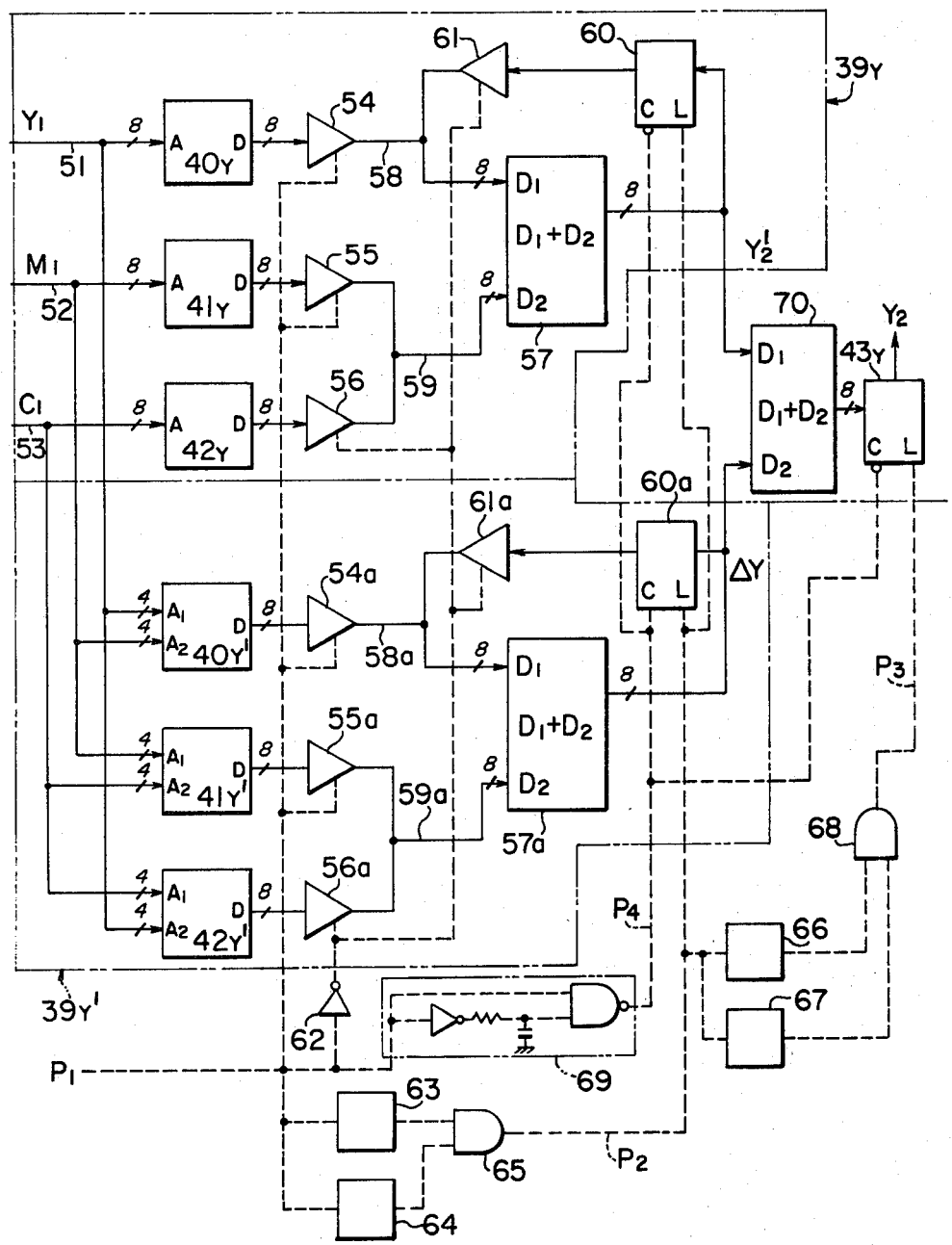
FIG. 5 is still another embodiment of the yellow operator.

In FIG. 5, there is shown the third embodiment of the yellow operator which is capable of the masking operation represented in the formula (3) including the quadratic terms having two of the independent variables as expressed by the formula (4).

The formula (3) is the sum of the formulae (5) and (4), that is $Y_2$ equals, $Y_2'$ plus $\Delta Y$. The data $Y_2'$ is obtained by the circuit 39Y shown by a two dotted line in FIG. 5, which is the same as the circuit of FIG. 3 and hence the detailed description thereof is omitted. The data $\Delta Y$ is the sum of three items (of the same form as $Y_2'$), and accordingly is operated by an operator 39Y' having the same construction and function as those of the operator 39Y, wherein the similar symbols denote the corresponding members of the operator 39Y and 39Y'. The operator 39Y' is controlled by the clock pulses P1, P2, P3 and P4 in the same manner as the operator 39Y.

In the operator 39Y', three 4-bit data $Y_1'$, $M_1'$ and $C_1'$ represent the upper 4-bits of the data $Y_1$, $M_1$ and $C_1$. In the memory tables 40Y', 41Y' and 42Y', store the data for each of the primary colors corresponding to the three terms $a_{y7}Y_1M_1$, $a_{y8}M_1C_1$, and $a_{y9}C_1Y_1$. The memory tables 40Y', 41Y' and 42Y' have upper and lower 4-bit input addresses $A_1$ and $A_2$, and, when the memory tables are addressed by the data $Y_1'$ and $M_1'$; $M_1'$ and $C_1'$; and $C_1'$ and $Y_1'$, the tables 40Y', 41Y' and 42Y' output the data corresponding to the terms $a_{y7}Y_1M_1$, $a_{y8}M_1C_1$, and $a_{y9}C_1Y_1$, which are summed in the same manner as described above by the operator 39Y, thereby obtaining the data $\Delta Y$.

Then, the adders 57 and 57a send the data $Y_2'$ and $\Delta Y$ of the formulae (5) and (4) to terminals $D_1$ and $D_2$ of an adder 70 and the data $Y_2'$ and $\Delta Y$ are added there to obtain the sum data $Y_2$ which is sent to the latch circuit 43Y and is latched therein.

In any one of the above described embodiments, one of the data $Y_1$, $M_1$ and $C_1$ is zero at any given moment since $N_1$ is equal to one of the data, $B_3$ $G_3$ and $R_3$ as described previously in connection with the color and gray component controller 27. Therefore, in any of the embodiments, only two out of the three memory tables 40Y, 41Y and 42Y are actually at work. And, in the case of the last embodiment, only one of the three memory tables, 40Y', 41Y' and 42Y' is actually at work at any given moment.

Furthermore, if any one of the masking factors, i.e., coefficients, $a_{y1}$, $a_{y2}$ ... $a_{c3}$, is negative in sign, then the corresponding computation is a subtraction instead of an addition, but all the computations, irrespective of the signs, are made by the adders 57 and 57a.

According to the present invention, the masking operational controller 28 is not necessarily arranged after the color and gray components controller 27, and instead may be positioned before the controller 27. In this case, the operation is carried out by using the color data $R_3$, $G_3$ and $B_3$ instead of the data $Y_1$, $M_1$ and $C_1$, accordingly.

Generally, several sets of basic memory tables are prepared for the masking operation, and any of them may be corrected independently, as the occasion demands, as described above. Further, of course, the tables may be corrected with reference to one another according to the relation among the tables.

The characteristic line of the data stored in the tables may be drawn in a chart by consecutively plotting the data as it is read out of the tables, as described above, by using a data plotter, or the like. Conversely, from a given characteristic line, the data may be picked up and stored in memory tables.

From the characteristic line of a set of data, the relation of the best masking conditions of the masking data may be readily determined, and when one of the masking data is corrected, other masking data may be easily adjusted thereto.

Although the present invention bas been shown and described in terms of preferred embodiments thereof, various changes and modifications thereof can be made by those skilled in the art without departing from the scope of the present invention.

What is claimed is:

1. A picture reproducing method, comprising
   scanning an original color picture and producing a plurality of picture density signals therefrom corresponding to a plurality of primary colors,
   converting said picture density signals into digital picture signals, providing a color operator for each of said primary colors, each color operator including a plurality of memory tables, one for each of said primary colors, addressing the memory tables of each color operator with said respective digital picture signals thereby producing predetermined outputs from said memory tables and adding together the outputs from the memory tables of each color operator to provide a masking color signal for the respective one of said primary colors corresponding to that color operator, and transmitting said masking color signals to a recording head for recording a reproduction picture on a recording film.

2. The picture reproducing method of claim 1 wherein the predetermined output of at least one of said memory tables is the sum of the input multiplied by a certain factor and the square of the input again multiplied by a certain factor.

3. The picture reproducing method of claim 2 wherein the number of primary colors is three and the sum of the outputs from the memory tables of each color operator is obtained in two steps, one step of adding the outputs from two of the memory tables to produce a sum and the other step of adding the output of the remaining memory table to the sum.

4. The picture reproducing method of claim 3 wherein said certain factor and said another certain factor are unity and zero, respectively.

5. The picture reproducing method of claim 1, further comprising providing each color operator with a plurality of second memory tables, one for each of said primary colors, coding each of the masking color signals and digital picture signals as an 8-bit binary, but sending only their upper four bits to the second memory tables as their inputs.

6. The picture reproducing method of claim 5 further comprising the step of supplying digital picture signals for a pair of the primary colors to a second memory table which in turn produces an output signal corresponding to the product of the digital picture signals of the two primary colors, and adding each of the thus obtained output signals to the masking color signal for the respective color operator.

7. The picture reproducing method of claim 5 wherein the number of primary colors is three and the sum of the outputs from the first memory tables is obtained in two steps, one step of adding the outputs from two of the memory tables and the other step of adding the output of the remaining first memory tables to the sum, the sum of the outputs from the second memory tables and the grand sum of the sums of the outputs from the first memory tables and the second memory tables being obtained in the same manner as the sum of the outputs from the first memory tables with proper shifting of their timing.

8. A picture reproducing machine, comprising a picture scanning unit operative to scan an original color picture and produce a plurality of picture density signals therefrom corresponding to a plurality of primary colors, an analog/digital converter operatively connected to said picture scanning unit for converting said picture density signals into digital picture signals, a digital color operational system including a masking operational controller including a color operator for each of said primary colors, each color operator including a plurality of memory tables, one for each of said primary colors, the memory tables of each color operator being addressed by said respective digital picture signals thereby producing predetermined outputs from said memory tables, and an adder operative to add together the outputs from the memory tables of the respective color operator to produce a masking color signal for the respective one of the primary colors corresponding to that color operator, a record scanning unit including means for supporting a recording film, a recording head and means for moving said recording head relative to said recording film in response to scanning movement of said picture scanning unit, a timing control unit operatively connected to said picture scanning unit, record scanning unit and digital color operational system to coordinate the respective operations thereof, including means for transmitting recording data from said digital color operational system to the recording head thereby to record a reproduction picture on the recording film.

9. The picture reproducing machine of claim 8 wherein each of the masking color signals and the digital picture signals is coded as an 8-bit binary.

10. The picture reproducing machine of claim 9 wherein each memory table is made to produce its output as the sum of its input multiplied by a certain factor and the square of its input again multiplied by another certain factor.

11. The picture reproducing machine of claim 10 wherein there are nine memory tables as a combination of three sets of three memory tables, wherein each set of the memory tables is for outputting the masking control signal of one of the three primary colors while the three memory tables in each of the sets receive the digital picture signals of the three different primary colors.

12. The picture reproducing machine of claim 11 further comprising a latch circuit and an adder for each of the primary colors for carrying out the summation of the outputs of the three memory tables in one of the sets in two steps, one in which the outputs from two of the three memory tables are added up by the adder and the sum is latched in the latch circuit and the other in which the value latched in the latch circuit is added to the output from the remaining memory table by the same adder.

13. A picture reproducing machine, comprising a picture scanning unit operative to scan an original color picture and produce a plurality of picture density signals therefrom corresponding to a plurality of primary colors, an analog/digital converter operatively connected to said picture scanning unit for converting said picture density signals into digital picture signals, a digital color operational system including a masking operational controller including a color operator for each of said primary colors, each color operator including a plurality of first memory tables, one for each of said primary colors, the first memory tables of each color operator being addressed by said respective digital picture signals thereby producing predetermined outputs from said first memory tables, a plurality of second memory tables, one for each of said primary colors, the second memory tables of each color operator being addressed by respective pairs of said digital picture signals and adapted to produce predetermined outputs from said second memory tables corresponding to the product of the pair of digital picture signals addressing the respective second memory table, and an adder operative to add together the outputs from the first and second memory tables of the respective color operator to produce a masking color signal for the respective one of the primary colors corresponding to that color operator, a record scanning unit including means for supporting a recording film, a recording head and means for moving said recording head relative to said recording film in response to scanning movement of said picture scanning unit, a timing control unit operatively connected to said picture scanning unit, record scanning unit and digital color operational system to coordinate the respective operations thereof, including means for transmitting recording data from said digital color operational system to the recording head thereby to record a reproduction picture on the recording film.

14. The picture reproducing machine of claim 13 wherein each of the masking color signals and the digital picture signals is coded as an 8-bit binary but the input of each of the second memory tables consists of only the upper four bits of the corresponding digital picture signal.

15. The picture reproducing machine of claim 14 wherein each of the first memory tables is operative to produce its output as the sum of its input multiplied by a certain factor and the square of its input again multiplied by another certain factor.

16. The picture reproducing machine of claim 15 wherein each of the second memory tables is operative to produce its output as the product of its two inputs multiplied by a certain factor.

17. The picture reproducing machine of claim 16 wherein there are nine first memory tables as a combination of three sets of three first memory tables, each set of the first memory tables for outputting the masking color signal of one of the three primary colors while the three first memory tables in each of the three sets receive the color signals of the three different primary colors.

18. The picture reproducing machine of claim 17 wherein the second memory tables comprise nine memory tables as a combination of three sets of three memory tables, each of the sets for outputting the masking color signal of one of the three primary colors while the three second memory tables in each of the three sets receive the two digital picture signals of a combination of different two of the three different primary colors.

19. The picture reproducing machine of claim 18 comprising three adders and three latch circuits for each of the primary colors, the first adder for adding two of the three outputs from the first memory tables, and, after latching the output of the first adder in the first latch circuit, then, adding the latched value to the output of the remaining first memory table, the second adder for adding the two of the three outputs from the second memory tables and, after latching the output of the second adder, adding the latched value to the output of the remaining second memory table, and the third adder for adding up the final sums from the first and second adder and latching the output from the third adder in the third latching circuit as the masking color signal.

* * * * *